INVENTOR
Norman J. Crowey
BY Joseph Schofield
ATTORNEY

Nov. 10, 1936.　　　N. J. CROWEY　　　2,060,044
SCREW THREAD GRINDER
Filed Feb. 26, 1935　　　4 Sheets-Sheet 4

INVENTOR
*Norman J. Crowey*
BY
*Joseph K. Schofield*
ATTORNEY

Patented Nov. 10, 1936

2,060,044

UNITED STATES PATENT OFFICE 2,060,044

SCREW THREAD GRINDER

Norman J. Crowey, West Hartford, Conn., assignor, by mesne assignments, to Niles-Bement-Pond Company, New York, N. Y., a corporation of New Jersey Application February 26, 1935, Serial No. 8,331

6 Claims. (Cl. 51—95)

This invention relates to precision screw thread grinding machines and particularly to means for moving the work and wheel relatively toward and from each other to effect this movement during the grinding operation to adjust the machine for different diameters of the work and also to compensate for wheel wear.

An object of the present invention is to provide two interdependent means for effecting toward and from relationship between the wheel and the work supporting means, one of which means is used to position the wheel and work relative to each other for different diameters of work pieces and to adjust for wheel wear, the other means being used to feed the work and wheel relatively toward each other a predetermined definite amount and at an extremely slow uniform or feeding rate and to return these members to their original or separated positions.

One feature which enables me to accomplish the above named objects is that the abrasive wheel and its supporting head are adjustable toward and from the axis of the work by means of a screw threaded member rotatably mounted within the base of the machine which engages the wheel head by means of its screw threads, this member being also axially movable limited distances within the base of the machine.

Another feature of importance is that the axial movement of the screw threaded member is effected by a spiral cam rotatably mounted upon a fixed axis within the base and engaging the rear end of the screw threaded member which in turn is adjustably connected to the head.

A still further feature of the invention which is advantageous is that all movements of the wheel head toward and from the work are effected by operation of one member. The axial movement of this member is used to advance and return the wheel predetermined distances relative to the work to effect feeding movements thereof during the grinding operation. The rotating means for this member are used to vary the adjustments of the head toward and from the work and thus vary the position of the wheel relative to the work for different diameters of work and to compensate for wheel wear. These movements of the axial and rotatably movable member are controlled by separate and independent mechanisms, the adjusting means for diameter adjustment and to compensate for wheel wear preferably being manually operated, and the axial adjusting means for controlling the feeding movements being moved by and in timed relation to the reciprocations of the work past the wheel.

With the above and other objects in view my invention includes the features of construction and operation set forth in the following specification and illustrated in the accompanying drawings.

In the accompanying drawings annexed hereto and forming a part of this specification, I have shown my invention embodied in a tap grinding machine for relatively small sizes thereof but it will be understood that the invention can be otherwise embodied and that the drawings are not to be construed as defining or limiting the scope of the invention, the claims appended to this specification being relied upon for that purpose.

In the above mentioned drawings I have shown but one embodiment of the invention which is now deemed preferable but it is to be understood that changes and modifications may be made within the scope of the appended claims without departing from the spirit of the invention.

Briefly and in its preferred aspect my invention may include the following principal parts: First, a base on which a work table may be mounted for horizontal reciprocation along suitable ways or other supporting surfaces; second, work supporting and rotating means mounted on said table, the rotation of the work being effected in timed relation to its axial movement during the grinding operation; third, an abrasive wheel rotatably mounted within a head slidably supported on the base in rear of the table, the head being movable directly toward and from the axis of the work supported upon the table; fourth, a cam of generally spiral form rotatably mounted about a fixed axis in the base and having means to slowly rotate it during reciprocations of the work supporting table; fifth, a member connected to the wheel head by means of screw threads and mounted for limited axial movement within and transversely of the base, one end of this axially movable member contacting with and being operated by the cam to advance and return the wheel head toward and from the axis of the work; and sixth, manually operated means to rotate the adjustable screw threaded member so that the wheel may be positioned for a wide variety of sizes of work and to compensate for wearing away of the wheel.

Figure 1:
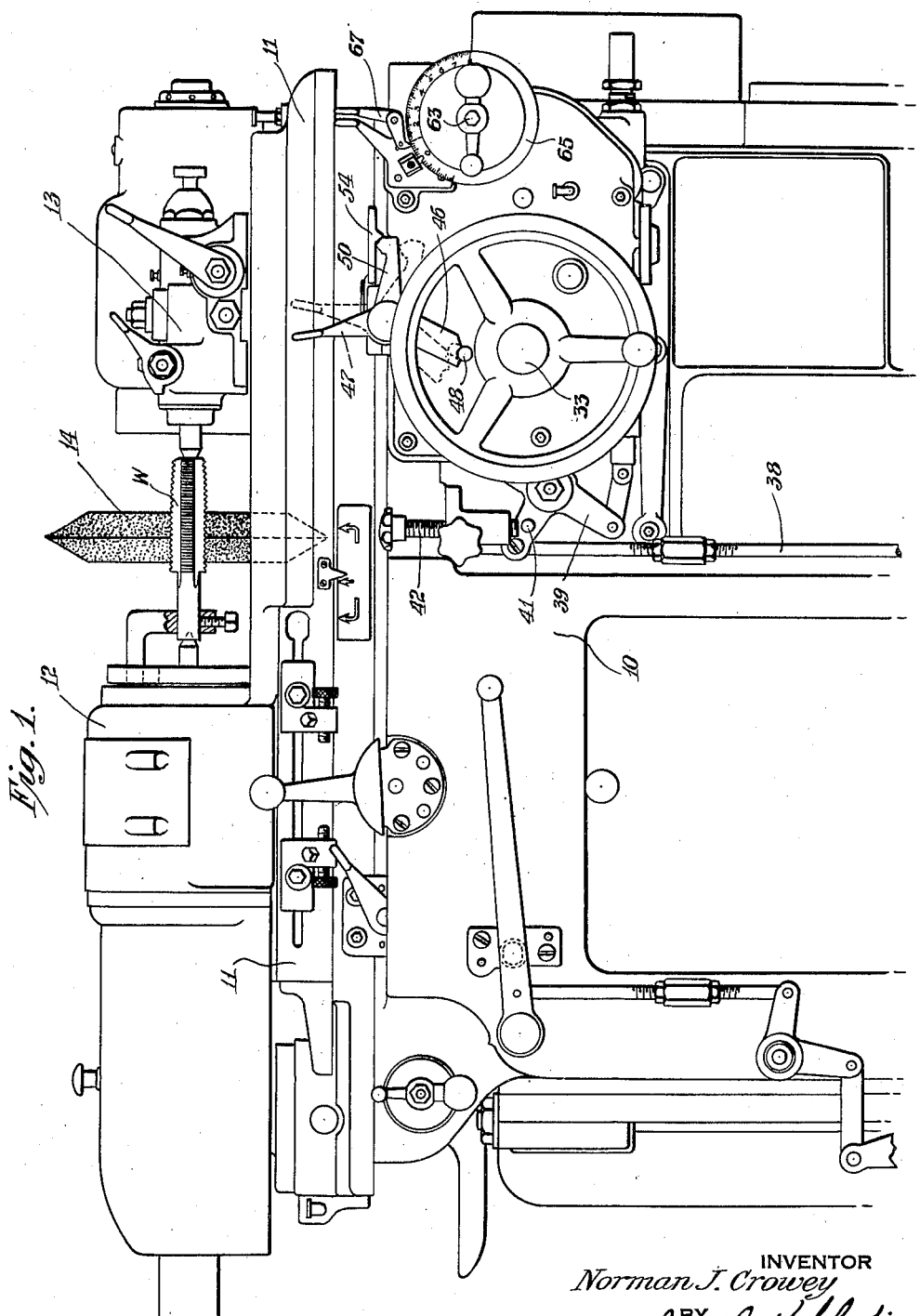
Figure 1 is a front elevation of the principal portions of a screw thread grinding machine to which the present invention may be applied.
Figure 4:
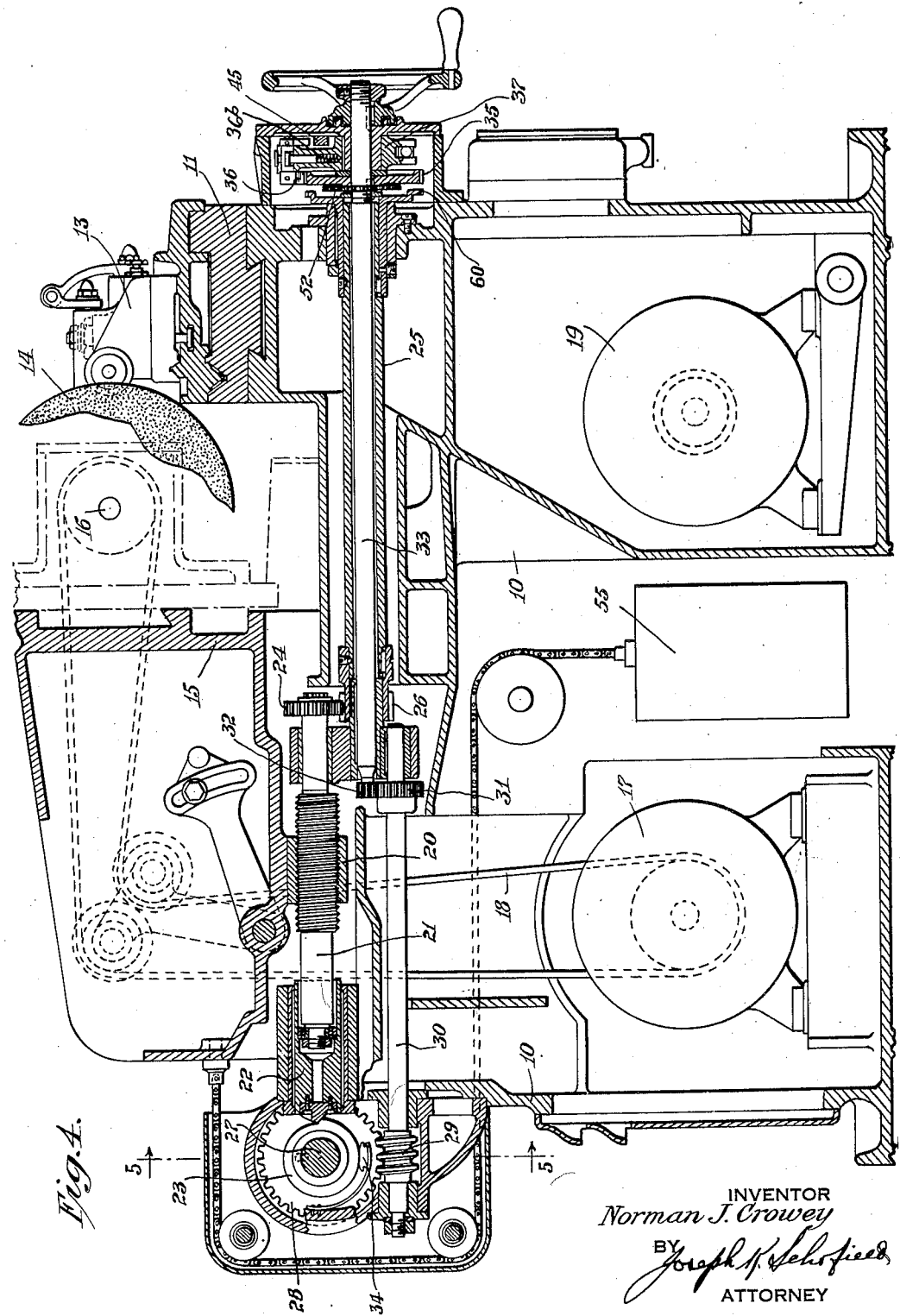
Fig. 4 is a vertical transverse sectional view of a complete machine to which the present invention has been applied.
Figure 5:
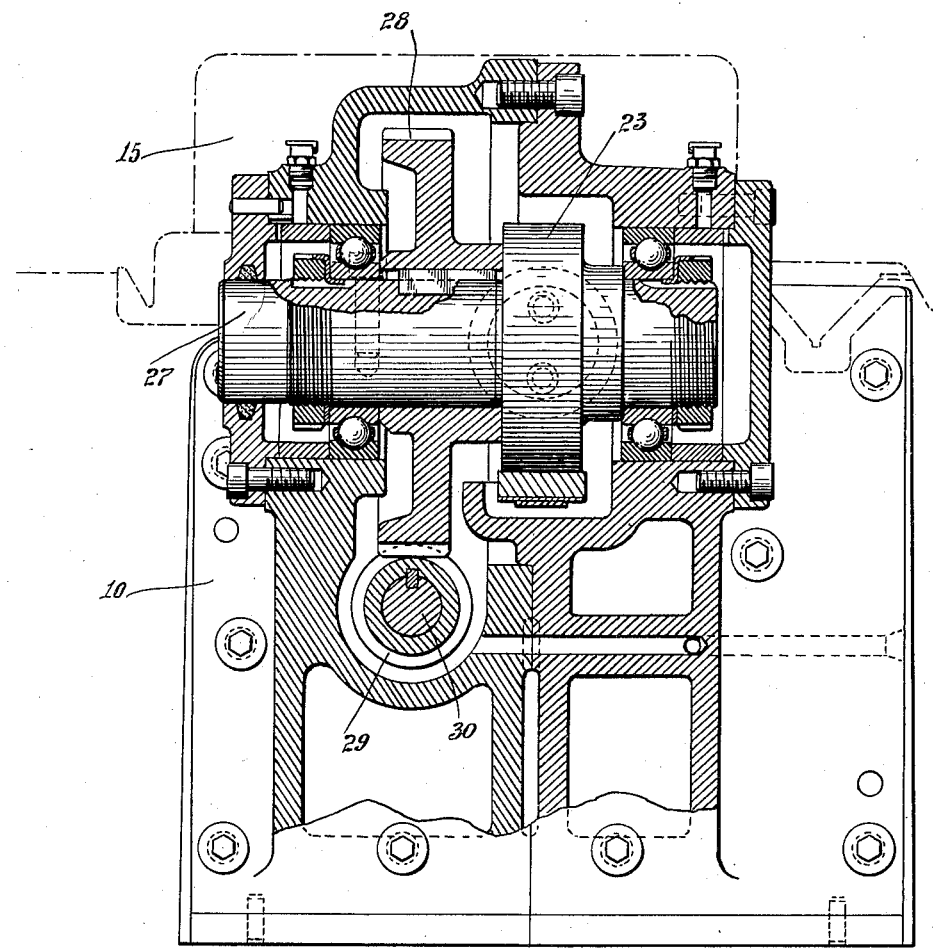
Fig. 5 is a vertical sectional view showing the feed cam and its driving means, this view being taken from the rear of the machine.

Referring more in detail to the figures of the drawings, I provide a base 10 on which is slidably mounted a table 11 for supporting and rotating the work W being ground. This table 11, as shown in Figs. 1 and 4, may have a headstock 12 at one end and a tailstock 13 at the opposite end by means of which the work W being ground may be properly supported for operation by the wheel 14. Within the headstock 12 is provided the advancing means for moving the table 11 back and forth between adjustable limits, the operating mechanism therefor being preferably housed within the base 10. Rotating means for the work W being ground, preferably a leader screw, is also provided within the headstock. As this mechanism and the operating and controlling means form no part of the present invention it is not thought that any further description of them will be necessary. It will suffice to state that the length of reciprocatory movement of the table 11 to axially move the work piece will be adjusted for different lengths of work pieces W. By means of proper connections between the reciprocating and rotating means forming no part of the present invention and therefore not shown, the work W may be rotated different numbers of revolutions for given longitudinal movements of the table and work for screw threads having different leads.

Mounted in rear of the table 11 of the work supporting and rotating means is a wheel head or carriage 15 on which is rotatably mounted the abrasive wheel 14. The head portion of the slidably mounted carriage 15 supporting the bearings for the wheel spindle 16 may be angularly adjusted to properly engage the wheel 14 with the screw threads being ground. By means of a suitable motor 17 within the base 10 of the machine and driving connections 18 to the wheel spindle 16, the wheel 14 may be rotated at any desired high speed.

In order to position the wheel 14 for different diameters of work W the wheel head or carriage 15 is provided with a depending lug 20 fixed thereto and having internal screw threads engaging corresponding external screw threads upon a short shaft 21, slidably mounted within limited distances transversely of the machine within the base 10. This short transverse shaft 21 is mounted within suitable bearings for its limited axial slidable movement and also for rotation, the shaft being rotatable while it is moving axially. At its rear end this shaft 21 is provided with a member 22 non-rotatably mounted but slidable within the base 10 and adapted to engage a cam 23 presently to be more fully described. The opposite or forward end of the shaft 21 is provided with a gear 24 by means of which it may be rotated to position the wheel 14 and wheel supporting carriage 15 for varying diameters of work W. To effect rotation of this shaft 21 by its gear 24 there is provided a transversely mounted hollow shaft or tube 25 within the base 10 having a gear 26 upon its rear end. This gear 26 is materially wider than gear 24 and engages the teeth thereof. Gears 24 and 26 are therefore always in engagement in all axial positions of the member 21. By rotating the tube 25 by means provided therefor at the front face of the machine the position of the wheel 14 may be adjusted between very wide limits. The means for effecting rotation of this transversely extending tube 25 for adjusting the wheel 14 for different diameters of work and for compensating for wheel wear will presently be more fully described.

In rear of the base 10 and upon a fixed axis extending longitudinally of the machine is a short cam shaft 27. This cam shaft 27 rotatably supports the feed cam 23 which is of generally spiral form, there being one rise only throughout the complete periphery of the cam. Mounted on this shaft 27 adjacent the cam 23 is a worm wheel 28 engaging a worm 29 mounted upon a shaft extending transversely of the machine within the base to the front thereof. It will be seen from the above that by rotation of the shaft 30 carrying the worm 29 the cam 23 will be rotated and through its connection with the screw threaded member 21 engaging the wheel head 15 the wheel 14 will be advanced a predetermined limited distance and then returned to its initial position with each rotation of the cam. In order to rotate this cam 23 to give a substantially uniform feed of the wheel 14 toward the work W during the grinding operation and a quick return movement thereof, the forward end of the worm shaft 30 is provided with a gear 31 in mesh with a gear 32 upon the rear end of a forwardly extending shaft 33 preferably disposed directly within the tubular member or hollow shaft 25 referred to above. By means of mechanism mounted upon the front end of this shaft 33 presently to be described the cam 23 may be very slowly rotated to slowly feed the wheel 14 toward the work W uniformly during the grinding operation. To maintain the peripheral surface of cam 23 free from particles of dust and covered with a thin film of oil, a soft absorbent pad 34 may be provided tightly pressed toward the cam by a spring.

In order to effect this rotative movement of the cam 23 there is provided a ratchet wheel 35 keyed directly to the forward end of this shaft 33 and having a pawl 36 engaging its teeth. The pawl 36 is mounted upon a member 37 freely rotatable concentrically with the shaft 33. To effect oscillatory movements of the pawl 36 and its supporting member 37 there is provided an actuating shaft or rod 38 extending from the driving mechanism for the table 11 and work supporting and rotating means within the base 10. This shaft or rod 38 is reciprocated vertically by means (not shown) as the work table 11 moves back and forth during the grinding operation. This rod 38 is connected to the oscillating member 37 through a bell crank member 39 and a connecting link 40. By reference to Fig. 2 it will be seen that oscillation of the bell crank member 39 will be effected by its actuating rod 38 which takes place periodically in timed relation to the reciprocations of the table 11. Movement of the oscillating member 37 will oscillate the pawl 36 positively in one direction to a fixed limit. The opposite limit of movement of the pawl may be determined by contact of an abutment 41 on the bell crank member 39 with an adjustable screw 42 fixed to the machine base. In order to return the bell crank member 39 toward its initial position as limited by the abutment 41 there is mounted a helical spring 43 adjustable as to tension preferably connected to a third arm on the bell crank member 39 as by a connecting link 43ª.

Figure 2:
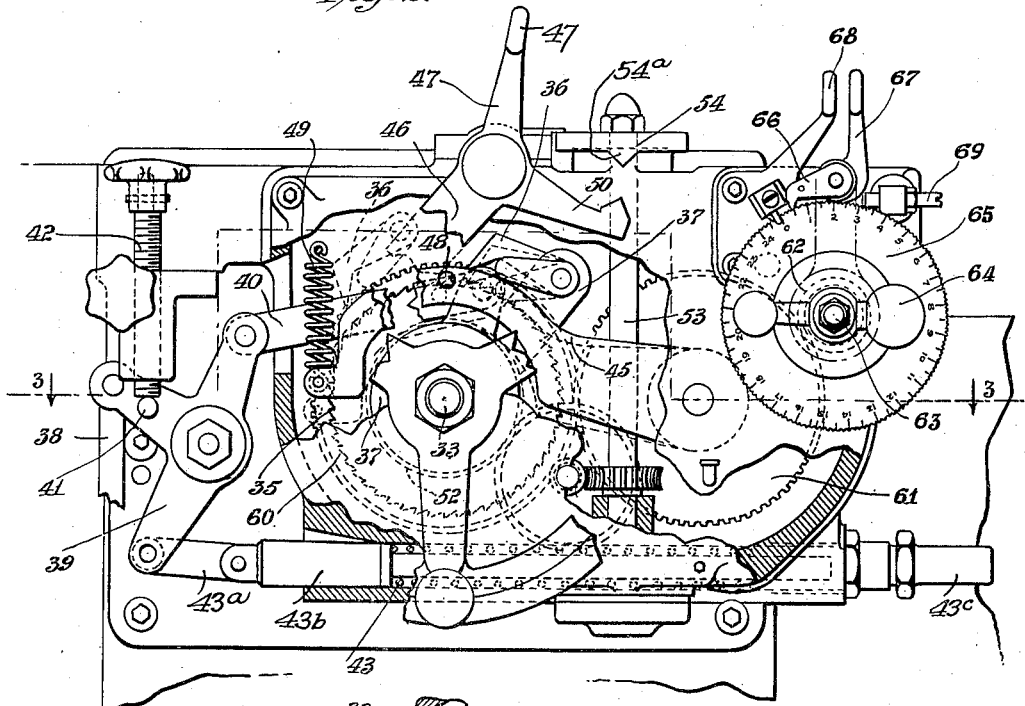
Fig. 2 is a fragmentary vertical view partly in section and upon an enlarged scale relative to Fig. 1 showing the feed controlling mechanism for moving the abrasive wheel relative to the work.
Figure 3:
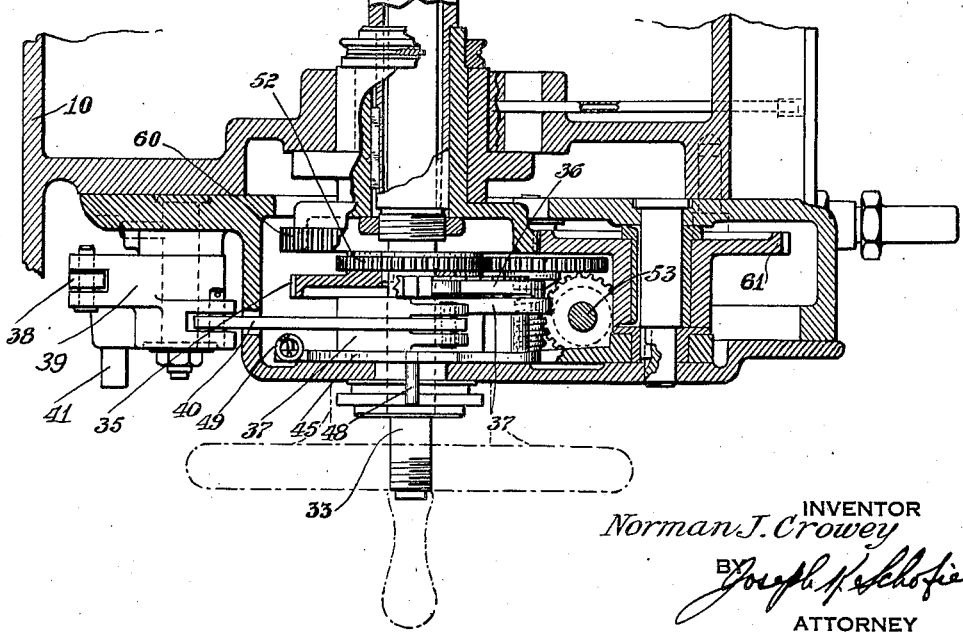
Fig. 3 is a horizontal sectional view taken upon the plane of line 3—3 of Fig. 2.

As shown in Fig. 2, the spring 43 surrounds the reduced portion of a rod 43ᵇ slidably mounted in the base of the machine. Spring 43 has one end engaging against the shoulder formed by the reduced extension of rod 43ᵇ, the opposite end of which may enter and contact with the end wall of a cap member 43ᶜ secured to the side face of the housing for ratchet wheel 37 and adjacent parts.

During the grinding operation during which the table 11 is being continuously reciprocated the rod 38 is being periodically reciprocated vertically by means associated with the table reciprocating and work rotating means. The oscillating member 37 is therefore continuously being moved back thus oscillating the pawl 36 to advance the ratchet wheel 35 and shaft 33 very slowly in one direction to rotate the feed cam 23. The wheel 14 is therefore slowly fed toward the work W to a predetermined position determined by the rotative adjustment of member 21 and the maximum diameter of the cam. Upon completing one rotation the cam 23 rapidly returns the wheel 14 to its initial or rearward position. Unless the member 21 is adjusted rotatively the limits of each movement of the wheel 14 is precisely fixed by the cam 23 and each rotation of the cam therefore brings the wheel 14 to precisely the same distance from the axis of the work. Each work piece W therefore will be ground to precisely the same diameter until wearing away of the wheel takes place. Compensation for this wearing away of the work engaging surface of the wheel 14 will presently be more fully described.

Figure 6:
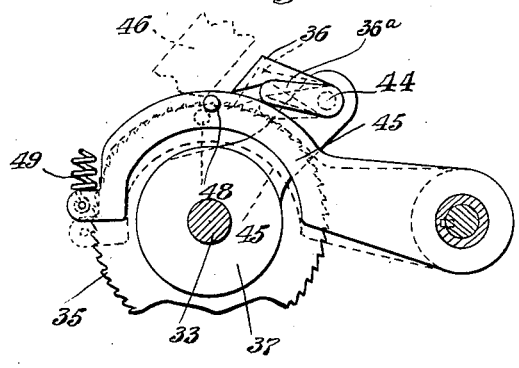
Fig. 6 is a detail view in elevation of some of the parts shown in Fig. 2.

As it is desired to stop operation of the machine automatically after the wheel 14 has been advanced to its position nearest the work W so that complete grinding of the work has taken place and the wheel has been returned to its initial position, there is provided a stop mechanism operating by preventing the engagement of the pawl 36 with its ratchet wheel 35. For this purpose there is provided a guard member 45, see Fig. 6, adjacent the ratchet wheel 35 and in front thereof. This member during operation of the machine is held in its lowered position permitting the pawl 36 to engage the teeth of the ratchet wheel 35. Upon completion of the grinding operation and the return of the wheel 14 to its rearward or inoperative position by cam 23 this guard member 45 is elevated sufficiently to prevent engagement of the pawl 36 with the ratchet wheel teeth 35, thus preventing any further feeding movement of the wheel 14. The guard member 45 does not directly contact with the pawl but with a short lever connected therewith and outstanding laterally therefrom. As will be seen in Figs. 4 and 6, the pawl 36 is mounted upon an end of a short rod 44 extending through the member 37. On the opposite end of the transverse rod 44 is a short lever 36ª extending generally parallelly with the pawl 36. Member 45 when elevated engages the end of lever 36ª and thus oscillates rod 44 and the pawl 36 beyond the periphery of the ratchet wheel 35. Normally the pawl 36 may be forced toward the periphery of the ratchet wheel by a spring housed within the arm of member 37. This spring is indicated in Fig. 4 at 36ᵇ.

Guard member 45 is held in its position permitting operation of the ratchet wheel 35 by pawl 36 by means of a latch 46 upon a portion of the starting lever 47. This forms an arm or extended portion of the starting lever 47 for the feed mechanism. While in operative position, the end of the latch 46 engages a pin 48 outstanding from the guard member 45 which thus holds the guard member 45 below the periphery of the ratchet wheel 35. In order to stop operation of the feed mechanism it is only necessary to manually or otherwise oscillate this lever 47 toward the right from the position shown in full lines in Fig. 1 whereupon a spring 49 elevates the guard member 45 and engages lever 36ª to prevent the pawl 36 from engaging and rotating the ratchet wheel 35.

In order to stop operation of the feeding mechanism at the completion of one revolution of the feeding cam 23 there is provided a knock-off cam 54 for oscillating starting lever 47 to release the latch 46. This cam 54 is provided with a projection 54ª which in one rotative position engages an arm 50 extending substantially horizontally from starting lever 47. To rotate cam 54 there is provided a gear 52 rotatable with the ratchet wheel 35 and shaft 33 and driving a vertical shaft 53 having cam 54 at its upper end. The driving connections between the gear 52 on shaft 33 adjacent the ratchet gear 35 and the cam shaft 53 are such that cam 54 rotates at exactly the same speed as cam 23. One rotation of each of these cams 23 and 54 completes one cycle of operation of the machine. This cam 54, as shown in Figs. 1 and 2, has a single lug or projection 54ª depending from its lower face which in one position engages and oscillates arm 50 and disengages the latch 46 from its pin 48. The rotation of this cam 54 is timed in unison with the feed cam 23 so that by setting the knock-off lug 54ª of the cam 54 properly the feeding mechanism may be stopped as soon as the feeding cam 23 has made one complete revolution. This stop mechanism is also adapted to operate at the point of rotation of the feeding cam 23 immediately after its high point has passed the projection on member 22 on the rear end of the screw threaded member 21 and has returned the wheel head 15 and wheel 14 to their rearward position. This return movement of the wheel supporting carriage 15 and parts associated therewith is effected by means of the counterweight 55, mounted within the base 10 of the wheel and connected by means of a chain 56 over suitable pulleys with the rear vertical face of the wheel head 15. At all times during the operation of the machine the counterweight 55 holds the wheel supporting carriage 15 as far as permitted away from the axis of the work W.

To rotate the member 21 to position the wheel 14 for different diameters of work pieces and to compensate for wearing away of the wheel, means are provided whereby the hollow shaft 25 may be rotated rapidly and also extremely small amounts. On the forward end of shaft 25 is a large gear 60 preferably fastened directly thereto. Gear 60 meshes with a similar gear 61 rotatably supported within the base 10. Gear 61 is in mesh with a pinion 62 on a short manually rotatable shaft 63. A handle 64 on this shaft permits rapid rotation of these gears and relatively rapid adjustment of the head 15 and wheel 14 toward or from the work axis. Preferably a graduated dial 65 is provided on the shaft 63 so that angular distances moved by the shaft 63 and the screw threaded member 21 may be accurately determined.

To facilitate slight rotative movements of shaft 63 to advance the wheel 14 to compensate for wearing away of its work engaging surface, the graduated dial 65 may have its periphery provided with serrations. A pawl 66 mounted on a freely mounted arm 67 having a handle at its extended end engages these serrations. By pressing handle 67 toward the left against a fixed abutment 68 the dial 65 and the shaft 63 are moved rotatively a very slight distance in a direction advancing the wheel 14 toward the work axis. An adjustable stop 69 may be provided to limit movement of arm 67 away from abutment 68.

The screw thread grinding machine in which the above described feeding and stop mechanism is adapted to be incorporated will be briefly described. The machine is started in operation by first starting rotation of the wheel 14 by means of its motor 17 and by starting the reciprocation of the table 11 by its motor 19. These means form no part of the present invention and therefore will not require description.

With the wheel 14 rotating at high speed and with the work reciprocating and rotating with movements back and forth of the table 11, the starting lever 47 may be moved toward the left to the position shown in full lines in Fig. 1. By this movement of the starting lever the guard member 45 for ratchet wheel 35 will be lowered to permit the ratchet 36 to oscillate wheel 35 and slowly rotate the feed cam 23. It will be understood that so long as the table is reciprocated rod 38 is reciprocating also which oscillates the pawl 36.

As soon as the starting lever 47 for the feed cam 23 is moved to starting position and the cam is started rotating the wheel 14 is slowly advanced toward the work. During the advancing movement of the wheel 14 and the simultaneous rotation and reciprocation of the work the grinding operation takes place. Preferably grinding takes place during travel of the table 11 in both directions, and in the case of smaller sizes of taps or other work the threads may be completely ground from an unthreaded blank. Grinding of the blank continues until the cam 23 substantially completes its rotation and advances the wheel to its closest position to the axis of the work. During this rotation of the cam 23 the cam 54 is also rotated. When the grinding operation has been completed by rotation of cam 23 the cam 54 has completed a rotation and has reached a position where its projection 54ᵃ contacts with and oscillates arm 50 of the starting or controlling lever 47. Movement of lever 47 by the projection 54ᵃ immediately stops rotation of feed cam 23 by freeing the guard member 45 for movement to its raised position and thus preventing engagement of pawl 36 with its wheel 35. The cam 54 is set so that the cam 23 is stopped when lever 47 is oscillated with the wheel 14 in its inoperative or rearward position. The table reciprocation may thereafter be stopped by any other means and the finished work removed preparatory to starting an entirely new operation.

What I claim is:

1. A screw thread grinding machine comprising in combination, a base, work supporting and rotating means thereon, a supporting head on said base having a rotatable wheel thereon, adjusting means for relatively moving said head and work supporting means toward and from each other, cam means supplemental to said adjusting means to move said head toward and away from said work supporting means a predetermined distance, means to rotate said cam one complete rotation during operation of said machine, and cam means to stop operation of said machine when said first mentioned cam has completed its rotation.

2. A screw thread grinding machine comprising in combination, a base, work supporting and rotating means thereon, a supporting head on said base having a rotatable grinding wheel thereon, adjusting means for relatively moving said head and work supporting means toward and from each other, an axially movable and rotatable member mounted within the base and engaging said head, a cam rotatably mounted in said base for moving said member a predetermined limited distance, means to rotate said member to adjust the distance between the head and work supporting means, and means to stop rotation of said cam after completing one complete rotation.

3. A screw thread grinding machine comprising in combination, a base, work supporting and rotating means thereon, a supporting head on said base having a rotatable grinding wheel thereon, adjusting means for relatively moving said head and work supporting means toward and from each other, an axially and rotatable member mounted within the base and engaging said head, a rotatably mounted cam in said base for slowly and uniformly moving said member a predetermined limited distance, means to rotate said member to adjust the distance between the head and work supporting means, and cam means to stop rotation of said first mentioned cam after completing one complete rotation.

4. A screw thread grinding machine comprising in combination, a base, work supporting and rotating means thereon, a supporting head on said base having a rotatable grinding wheel thereon, adjusting means for relatively moving said head and work supporting means toward and from each other, an axially and rotatable member mounted within the base and engaging said head, a cam rotatably mounted in said base for moving said member a predetermined limited distance, means to rotate said cam one complete rotation only and stop rotation thereof with the wheel retracted from the work, and manual means to rotate said member to adjust the distance between the head and work supporting means.

5. A screw thread grinding machine comprising in combination, a base, work supporting and rotating means thereon, a supporting head on said base having a rotatable grinding wheel thereon, adjusting means for relatively moving said head and work supporting means toward and from each other, an axially and rotatable member mounted within the base and engaging said head, a rotatably mounted cam in said base for slowly and uniformly moving said member axially a predetermined limited distance to slowly advance said head toward the work and rapidly withdraw said head when grinding has been completed, means to rotate said cam one complete rotation only and stop rotation thereof with the wheel retracted from the work, and means to rotate said member to base. In order to return the bell crank member 39 toward its initial position as limited by the abutment 41 there is mounted a helical spring 43 adjustable as to tension preferably connected to a third arm on the bell crank member 39 as by a connecting link 43a.

As shown in Fig. 2, the spring 43 surrounds the reduced portion of a rod 43b slidably mounted in the base of the machine. Spring 43 has one end engaging against the shoulder formed by the reduced extension of rod 43b, the opposite end of which may enter and contact with the end wall of a cap member 43c secured to the side face of the housing for ratchet wheel 37 and adjacent parts.

During the grinding operation during which the table 11 is being continuously reciprocated the rod 38 is being periodically reciprocated vertically by means associated with the table reciprocating and work rotating means. The oscillating member 37 is therefore continuously being moved back thus oscillating the pawl 36 to advance the ratchet wheel 35 and shaft 33 very slowly in one direction to rotate the feed cam 23. The wheel 14 is therefore slowly fed toward the work W to a predetermined position determined by the rotative adjustment of member 21 and the maximum diameter of the cam. Upon completing one rotation the cam 23 rapidly returns the wheel 14 to its initial or rearward position. Unless the member 21 is adjusted rotatively the limits of each movement of the wheel 14 is precisely fixed by the cam 23 and each rotation of the cam therefore brings the wheel 14 to precisely the same distance from the axis of the work. Each work piece W therefore will be ground to precisely the same diameter until wearing away of the wheel takes place. Compensation for this wearing away of the work engaging surface of the wheel 14 will presently be more fully described.

As it is desired to stop operation of the machine automatically after the wheel 14 has been advanced to its position nearest the work W so that complete grinding of the work has taken place and the wheel has been returned to its initial position, there is provided a stop mechanism operating by preventing the engagement of the pawl 36 with its ratchet wheel 35. For this purpose there is provided a guard member 45, see Fig. 6, adjacent the ratchet wheel 35 and in front thereof. This member during operation of the machine is held in its lowered position permitting the pawl 36 to engage the teeth of the ratchet wheel 35. Upon completion of the grinding operation and the return of the wheel 14 to its rearward or inoperative position by cam 23 this guard member 45 is elevated sufficiently to prevent engagement of the pawl 36 with the ratchet wheel teeth 35, thus preventing any further feeding movement of the wheel 14. The guard member 45 does not directly contact with the pawl but with a short lever connected therewith and outstanding laterally therefrom. As will be seen in Figs. 4 and 6, the pawl 36 is mounted upon an end of a short rod 44 extending through the member 37. On the opposite end of the transverse rod 44 is a short lever 36a extending generally parallelly with the pawl 36. Member 45 when elevated engages the end of lever 36a and thus oscillates rod 44 and the pawl 36 beyond the periphery of the ratchet wheel 35. Normally the pawl 36 may be forced toward the periphery of the ratchet wheel by a spring housed within the arm of member 37. This spring is indicated in Fig. 4 at 36b.

Guard member 45 is held in its position permitting operation of the ratchet wheel 35 by pawl 36 by means of a latch 46 upon a portion of the starting lever 47. This forms an arm or extended portion of the starting lever 47 for the feed mechanism. While in operative position, the end of the latch 46 engages a pin 48 outstanding from the guard member 45 which thus holds the guard member 45 below the periphery of the ratchet wheel 35. In order to stop operation of the feed mechanism it is only necessary to manually or otherwise oscillate this lever 47 toward the right from the position shown in full lines in Fig. 1 whereupon a spring 49 elevates the guard member 45 and engages lever 36a to prevent the pawl 36 from engaging and rotating the ratchet wheel 35.

In order to stop operation of the feeding mechanism at the completion of one revolution of the feeding cam 23 there is provided a knock-off cam 54 for oscillating starting lever 47 to release the latch 46. This cam 54 is provided with a projection 54a which in one rotative position engages an arm 50 extending substantially horizontally from starting lever 47. To rotate cam 54 there is provided a gear 52 rotatable with the ratchet wheel 35 and shaft 33 and driving a vertical shaft 53 having cam 54 at its upper end. The driving connections between the gear 52 on shaft 33 adjacent the ratchet gear 35 and the cam shaft 53 are such that cam 54 rotates at exactly the same speed as cam 23. One rotation of each of these cams 23 and 54 completes one cycle of operation of the machine. This cam 54, as shown in Figs. 1 and 2, has a single lug or projection 54a depending from its lower face which in one position engages and oscillates arm 50 and disengages the latch 46 from its pin 48. The rotation of this cam 54 is timed in unison with the feed cam 23 so that by setting the knock-off lug 54a of the cam 54 properly the feeding mechanism may be stopped as soon as the feeding cam 23 has made one complete revolution. This stop mechanism is also adapted to operate at the point of rotation of the feeding cam 23 immediately after its high point has passed the projection on member 22 on the rear end of the screw threaded member 21 and has returned the wheel head 15 and wheel 14 to their rearward position. This return movement of the wheel supporting carriage 15 and parts associated therewith is effected by means of the counterweight 55, mounted within the base 10 of the wheel and connected by means of a chain 56 over suitable pulleys with the rear vertical face of the wheel head 15. At all times during the operation of the machine the counterweight 55 holds the wheel supporting carriage 15 as far as permitted away from the axis of the work W.

To rotate the member 21 to position the wheel 14 for different diameters of work pieces and to compensate for wearing away of the wheel, means are provided whereby the hollow shaft 25 may be rotated rapidly and also extremely small amounts. On the forward end of shaft 25 is a large gear 60 preferably fastened directly thereto. Gear 60 meshes with a similar gear 61 rotatably supported within the base 10. Gear 61 is in mesh with a pinion 62 on a short manually rotatable shaft 63. A handle 64 on this shaft permits rapid rotation of these gears and relatively rapid adjustment of the head 15 and wheel 14 toward or from the work axis. Preferably a graduated dial 65 is provided on the shaft 63 so that angular distances moved by the shaft 63 and the screw threaded member 21 may be accurately determined.

To facilitate slight rotative movements of shaft 63 to advance the wheel 14 to compensate for wearing away of its work engaging surface, the graduated dial 65 may have its periphery provided with serrations. A pawl 66 mounted on a freely mounted arm 67 having a handle at its extended end engages these serrations. By pressing handle 67 toward the left against a fixed abutment 68 the dial 65 and the shaft 63 are moved rotatively a very slight distance in a direction advancing the wheel 14 toward the work axis. An adjustable stop 69 may be provided to limit movement of arm 67 away from abutment 68.

The screw thread grinding machine in which the above described feeding and stop mechanism is adapted to be incorporated will be briefly described. The machine is started in operation by first starting rotation of the wheel 14 by means of its motor 17 and by starting the reciprocation of the table 11 by its motor 19. These means form no part of the present invention and therefore will not require description.

With the wheel 14 rotating at high speed and with the work reciprocating and rotating with movements back and forth of the table 11, the starting lever 47 may be moved toward the left to the position shown in full lines in Fig. 1. By this movement of the starting lever the guard member 45 for ratchet wheel 35 will be lowered to permit the ratchet 36 to oscillate wheel 35 and slowly rotate the feed cam 23. It will be understood that so long as the table is reciprocated rod 38 is reciprocating also which oscillates the pawl 36.

As soon as the starting lever 47 for the feed cam 23 is moved to starting position and the cam is started rotating the wheel 14 is slowly advanced toward the work. During the advancing movement of the wheel 14 and the simultaneous rotation and reciprocation of the work the grinding operation takes place. Preferably grinding takes place during travel of the table 11 in both directions, and in the case of smaller sizes of taps or other work the threads may be completely ground from an unthreaded blank. Grinding of the blank continues until the cam 23 substantially completes its rotation and advances the wheel to its closest position to the axis of the work. During this rotation of the cam 23 the cam 54 is also rotated. When the grinding operation has been completed by rotation of cam 23 the cam 54 has completed a rotation and has reached a position where its projection 54ª contacts with and oscillates arm 50 of the starting or controlling lever 47. Movement of lever 47 by the projection 54ª immediately stops rotation of feed cam 23 by freeing the guard member 45 for movement to its raised position and thus preventing engagement of pawl 36 with its wheel 35. The cam 54 is set so that the cam 23 is stopped when lever 47 is oscillated with the wheel 14 in its inoperative or rearward position. The table reciprocation may thereafter be stopped by any other means and the finished work removed preparatory to starting an entirely new operation.

What I claim is:

1. A screw thread grinding machine comprising in combination, a base, work supporting and rotating means thereon, a supporting head on said base having a rotatable wheel thereon, adjusting means for relatively moving said head and work supporting means toward and from each other, cam means supplemental to said adjusting means to move said head toward and away from said work supporting means a predetermined distance, means to rotate said cam one complete rotation during operation of said machine, and cam means to stop operation of said machine when said first mentioned cam has completed its rotation.

2. A screw thread grinding machine comprising in combination, a base, work supporting and rotating means thereon, a supporting head on said base having a rotatable grinding wheel thereon, adjusting means for relatively moving said head and work supporting means toward and from each other, an axially movable and rotatable member mounted within the base and engaging said head, a cam rotatably mounted in said base for moving said member a predetermined limited distance, means to rotate said member to adjust the distance between the head and work supporting means, and means to stop rotation of said cam after completing one complete rotation.

3. A screw thread grinding machine comprising in combination, a base, work supporting and rotating means thereon, a supporting head on said base having a rotatable grinding wheel thereon, adjusting means for relatively moving said head and work supporting means toward and from each other, an axially and rotatable member mounted within the base and engaging said head, a rotatably mounted cam in said base for slowly and uniformly moving said member a predetermined limited distance, means to rotate said member to adjust the distance between the head and work supporting means, and cam means to stop rotation of said first mentioned cam after completing one complete rotation.

4. A screw thread grinding machine comprising in combination, a base, work supporting and rotating means thereon, a supporting head on said base having a rotatable grinding wheel thereon, adjusting means for relatively moving said head and work supporting means toward and from each other, an axially and rotatable member mounted within the base and engaging said head, a cam rotatably mounted in said base for moving said member a predetermined limited distance, means to rotate said cam one complete rotation only and stop rotation thereof with the wheel retracted from the work, and manual means to rotate said member to adjust the distance between the head and work supporting means.

5. A screw thread grinding machine comprising in combination, a base, work supporting and rotating means thereon, a supporting head on said base having a rotatable grinding wheel thereon, adjusting means for relatively moving said head and work supporting means toward and from each other, an axially and rotatable member mounted within the base and engaging said head, a rotatably mounted cam in said base for slowly and uniformly moving said member axially a predetermined limited distance to slowly advance said head toward the work and rapidly withdraw said head when grinding has been completed, means to rotate said cam one complete rotation only and stop rotation thereof with the wheel retracted from the work, and means to rotate said member to adjust the distance between the head and work supporting means.

6. A screw thread grinding machine comprising in combination, a base, a work support reciprocably mounted on said base and having work rotating means thereon, a wheel head having an abrasive wheel thereon mounted for movement toward and from said work rotating means, means to rotate said wheel, a rotatable and axially movable member mounted in said base, a spiral cam mounted on said base, means for slowly rotating said cam whereby said cam will axially move said member and said head a limited distance toward and from said work support, screw threaded means connecting said member and head whereby rotation of said member may advance and return said head and wheel toward and from said work support, means to rotatably adjust said screw threaded member to vary the limits of movement of said head effected by said cam, a second cam rotating synchronously with said spiral cam, and means operated by said second cam to stop rotation of said spiral cam with the head in retracted position.

NORMAN J. CROWEY.